United States Patent
Zhu et al.

(10) Patent No.: US 10,373,298 B2
(45) Date of Patent: Aug. 6, 2019

(54) IMAGE DISTORTION CORRECTION METHOD AND APPARATUS

(71) Applicant: Huawei Technologies Co., Ltd., Shenzhen (CN)

(72) Inventors: Congchao Zhu, Beijing (CN); Wei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/571,674

(22) PCT Filed: Sep. 15, 2015

(86) PCT No.: PCT/CN2015/089634
§ 371 (c)(1),
(2) Date: Nov. 3, 2017

(87) PCT Pub. No.: WO2017/045129
PCT Pub. Date: Mar. 23, 2017

(65) Prior Publication Data
US 2018/0122055 A1   May 3, 2018

(51) Int. Cl.
*G06T 3/40* (2006.01)
*G06T 5/50* (2006.01)
(Continued)

(52) U.S. Cl.
CPC .......... *G06T 5/006* (2013.01); *G06T 3/4038* (2013.01); *G06T 5/50* (2013.01); *H04N 5/23238* (2013.01); *G06T 2200/32* (2013.01)

(58) Field of Classification Search
CPC ..... G06T 3/4038; G06T 3/40; G06T 2200/32; G06T 5/006; G06T 5/50; H04N 5/23238
See application file for complete search history.

(56) References Cited

U.S. PATENT DOCUMENTS 2,111,854 A   3/1938  Gasso et al.
6,593,938 B1 *  7/2003  Sakata ................. H04N 1/3875
                                                   345/629
(Continued)

FOREIGN PATENT DOCUMENTS

CN   1577050 A   2/2005
CN   101212575 A  7/2008
(Continued)

OTHER PUBLICATIONS

Machine Translation and Abstract of Chinese Publication No. CN101276465, Oct. 1, 2008, 21 pages.
(Continued)

*Primary Examiner* — James R Sheleheda
(74) *Attorney, Agent, or Firm* — Conley Rose, P.C.

(57) ABSTRACT

A method includes shooting an $n^{th}$ frame of image at a first angle, where a projection of a distance value of a first pixel point of the $n^{th}$ frame of image to an optical center onto an optical axis direction is a first distance value, and a projection of a distance value of an $i^{th}$ pixel point of the $n^{th}$ frame of image to the optical center onto the optical axis direction is a second distance value, obtaining a third and a fourth distance value, obtaining a correction coefficient of the $i^{th}$ pixel point of the $n^{th}$ frame of image according to the first, the second, the third, and the fourth distance value, and correcting a location of the $i^{th}$ pixel point of the $n^{th}$ frame of image according to the correction coefficient using a location of an $i^{th}$ pixel point of the first frame of image as a reference.

18 Claims, 7 Drawing Sheets

(51) Int. Cl.
*H04N 5/232* (2006.01)
*G06T 5/00* (2006.01)

(56) References Cited

U.S. PATENT DOCUMENTS

| | | | | |
|---|---|---|---|---|
| 6,885,392 | B1* | 4/2005 | Mancuso | G06T 3/4038 |
| | | | | 348/218.1 |
| 7,271,803 | B2* | 9/2007 | Ejiri | H04N 13/0278 |
| | | | | 345/427 |
| 8,009,178 | B2* | 8/2011 | Chen | G06T 3/4038 |
| | | | | 345/419 |
| 8,310,538 | B2* | 11/2012 | Yanagita | G03B 5/02 |
| | | | | 348/135 |
| 8,542,289 | B1* | 9/2013 | McClatchie | H04N 5/247 |
| | | | | 348/211.11 |
| 9,407,851 | B2* | 8/2016 | Kweon | G06T 1/00 |
| 9,785,201 | B2* | 10/2017 | Elyada | G06Q 30/02 |
| 2002/0176021 | A1* | 11/2002 | Hahn | H04N 3/2335 |
| | | | | 348/607 |
| 2003/0223648 | A1 | 12/2003 | Albrecht | G06T 3/00 |
| | | | | 382/294 |
| 2003/0235344 | A1* | 12/2003 | Kang | G06K 9/32 |
| | | | | 382/284 |
| 2004/0189849 | A1 | 9/2004 | Hofer | |
| 2005/0036117 | A1 | 2/2005 | Kobayashi | |
| 2005/0180656 | A1* | 8/2005 | Liu | G06K 9/00228 |
| | | | | 382/284 |
| 2006/0072176 | A1* | 4/2006 | Silverstein | G06T 3/005 |
| | | | | 358/540 |
| 2007/0025636 | A1* | 2/2007 | Furukawa | G06T 1/60 |
| | | | | 382/275 |
| 2010/0238164 | A1* | 9/2010 | Steedly | G06K 9/32 |
| | | | | 345/419 |
| 2010/0265313 | A1* | 10/2010 | Liu | G06T 3/4038 |
| | | | | 348/36 |
| 2010/0265365 | A1* | 10/2010 | Oshita | H04N 5/23219 |
| | | | | 348/241 |
| 2010/0328456 | A1* | 12/2010 | Alakarhu | G01C 3/08 |
| | | | | 348/139 |
| 2011/0211040 | A1* | 9/2011 | Lindemann | G01C 11/02 |
| | | | | 348/36 |
| 2011/0298917 | A1* | 12/2011 | Yanagita | G03B 5/02 |
| | | | | 348/135 |
| 2012/0229628 | A1* | 9/2012 | Ishiyama | H04N 5/23212 |
| | | | | 348/135 |
| 2012/0243746 | A1* | 9/2012 | Higashimoto | H04N 5/23238 |
| | | | | 382/106 |
| 2013/0033567 | A1 | 2/2013 | Jeong et al. | |
| 2013/0050407 | A1* | 2/2013 | Brinda | G03B 37/02 |
| | | | | 348/38 |
| 2013/0342567 | A1* | 12/2013 | Muninder | G06T 11/60 |
| | | | | 345/630 |
| 2014/0362107 | A1* | 12/2014 | Fan | G06T 17/05 |
| | | | | 345/629 |
| 2014/0375762 | A1* | 12/2014 | Ohki | H04N 5/23238 |
| | | | | 348/36 |
| 2016/0286137 | A1* | 9/2016 | Marks | G06T 3/4038 |
| 2017/0018085 | A1* | 1/2017 | Liepelt | G06T 3/4038 |
| 2017/0032503 | A1* | 2/2017 | Raichman | G06T 5/006 |
| 2017/0280039 | A1* | 9/2017 | Stoppe | G06T 5/003 |
| 2018/0122055 | A1* | 5/2018 | Zhu | G06T 5/50 |
| 2018/0167599 | A1* | 6/2018 | Bae | H04N 5/2258 |
| 2018/0270414 | A1* | 9/2018 | Pai | H04N 5/23238 |

FOREIGN PATENT DOCUMENTS

| | | |
|---|---|---|
| CN | 101276465 A | 10/2008 |
| CN | 101833231 A | 9/2010 |
| CN | 101840570 A | 9/2010 |

OTHER PUBLICATIONS

Machine Translation and Abstract of Chinese Publication No. CN101833231, Sep. 15, 2010, 24 pages.
Machine Translation and Abstract of Chinese Publication No. CN101840570, Sep. 22, 2010, 12 pages
Foreign Communication From a Counterpart Application, PCT Application No. PCT/CN2015/089634, English Translation of International Search Report dated May 27, 2016, 2 pages.
Kee, E., "Video Mosaicking Using Ancillary Data to Facilitate Size Estimation" XP055452648, Jan. 17, 2003, 147 pages.
Foreign Communication From a Counterpart Application, European Application No. 15903820.7, Extended European Search Report dated Mar. 8, 2018, 9 pages.

* cited by examiner

IMAGE DISTORTION CORRECTION METHOD AND APPARATUS

CROSS-REFERENCE TO RELATED APPLICATION

This application is a national stage of International Patent Application No. PCT/CN2015/089634, filed on Sep. 15, 2015, which is hereby incorporated by reference in its entirety.

TECHNICAL FIELD

The present disclosure relates to the field of image processing, and in particular, to an image distortion correction method and apparatus.

BACKGROUND

In most existing panoramic technologies, optimization is performed for a horizontal direction. When shooting a panorama in the horizontal direction, a user smoothly moves a camera and shoots a frame of photo every a particular angle, and a wide panorama image may be generated through stitching. Although a stitched image may generate a particular geometric deformation, the deformation is not obvious because a shooting scene is usually far and a view is relatively wide.

However, when a panorama image is shot in a vertical direction, such as a skyscraper or a tall tree, the camera needs to be moved in the vertical direction to shoot multiple frames of photos at different angles. Then the multiple frames of photos are merged using an algorithm in order to generate the panorama image. However, a result of merging the multiple frames of photos shot in this manner may generally have different degrees of geometric deformation and distortion.

FIG. 1 is a schematic diagram of an image distortion generation principle when a panorama image is shot in a vertical direction. As shown in FIG. 1, for example, a mobile phone 20 is used to shoot a relatively tall building 10. Point O is a location (which is also a location of an optical center) of a camera of the mobile phone 20, and point C and point D are respectively a lowest point and a highest point that can be shot when the camera of the mobile phone 20 is used to shoot the building 10 at a particular angle. In FIG. 1, c (i.e, distance OE) is a projection of a distance value of point C to the optical center O onto an optical axis (shown by a dashed line OF in FIG. 1) direction, and d (i.e, distance OF) is a projection of a distance value of point D to the optical center O onto the optical axis direction. It can be seen from FIG. 1 that in a shooting process, in order to shoot the top of the building 10, the camera of the mobile phone 20 is not used to directly shoot the building 10 in the vertical direction, but is rotated upwards by a particular angle when being moved upwards, and the angle may be represented by $\angle COD$.

It should be noted that in FIG. 1, the building 10 is actually only a cross-section side view, that is, the entire building 10 is viewed as a straight line from the side. In a front view, any point on the building 10 may refer to any point in a particular line of the image. For example, point C in FIG. 1 may refer to any point in a line of the lowest end in the image. Point D may refer to any point in the line of the uppermost end in the image. Moreover, in other locations of the text, if a particular point on the building 10 is indicated, explanations are the same as those described above, and details are not described herein again.

Because of existence of a rotation angle, the optical axis of the camera in the mobile phone 20 is not perpendicular to a plane of the building 10. Therefore, within a range of a vertical perspective $\angle COD$ of the camera, projections of distance values of points at different heights of an imaging plane of the building 10 to the optical center O onto the optical axis direction are not equal (for example, in FIG. 1, a projected distance value d>c). Therefore, when a highest point of the building 10 shot by the mobile phone 20 at this included angle is point D, a height of a formed image is less than a height of a formed image of the shot building 10 whose highest point is point C. If these photos are merged, severe image deformation is inevitably caused, and an image effect is distorted severely.

FIG. 2 is an effect diagram after the distorted images are merged. As shown in FIG. 2, after the distorted images are merged, in the merged image, vertical lines bend, or the top contracts towards the middle, causing severe impact on visual experience of a user.

SUMMARY

Embodiments of the present disclosure provide an image distortion correction method and apparatus. A correction coefficient of a pixel point in each frame of image relative to a pixel point of the first frame of image is obtained and a location of the pixel point of the image is corrected according to the coefficient in order to resolve a problem of image deformation. The corrected image is used for image merging in order to avoid geometric distortion, for example, the composite image is not perpendicular and the top bends or is deformed, helping improving a panorama shooting effect.

According to a first aspect, the present disclosure provides an image distortion correction method, where the method includes shooting an $n^{th}$ frame of image at a first angle deviating from a vertical direction, where a projection of a distance value of a first pixel point of the $n^{th}$ frame of image to an optical center onto an optical axis direction is a first distance value, a projection of a distance value of an $i^{th}$ pixel point of the $n^{th}$ frame of image to the optical center onto the optical axis direction is a second distance value, and the first pixel point is a pixel point at a lowest end of the $n^{th}$ frame of image, obtaining a third distance value and a fourth distance value, where the third distance value is a projection of a pixel point at an uppermost end of the first frame of image to the optical center onto the optical axis direction when the first frame of image is shot at a second angle deviating from the vertical direction, the fourth distance value is a projection of a pixel point at a lowest end of the first frame of image to the optical center onto the optical axis direction when the first frame of image is shot at the second angle deviating from the vertical direction, the second angle is less than the first angle, and the first angle and the second angle are angles when the images are shot at a same side in the vertical direction, obtaining a correction coefficient of the $i^{th}$ pixel point of the $n^{th}$ frame of image according to the first distance value, the second distance value, the third distance value, and the fourth distance value, and correcting a location of the $i^{th}$ pixel point of the $n^{th}$ frame of image according to the correction coefficient using a location of an $i^{th}$ pixel point of the first frame of image as a reference, where a value of n is 2 to N, and a value of N is a positive integer greater than or equal to 2.

With reference to the first aspect, in a first possible implementation manner of the first aspect, obtaining a correction coefficient of the $i^{th}$ pixel point of the $n^{th}$ frame of image according to the first distance value, the second distance value, the third distance value, and the fourth distance value includes obtaining a first ratio according to the first distance value and the second distance value, obtaining a second ratio according to the third distance value and the fourth distance value, and obtaining the correction coefficient of the $i^{th}$ pixel point of the $n^{th}$ frame of image according to the first ratio and the second ratio.

With reference to the first possible implementation manner of the first aspect, in a second possible implementation manner of the first aspect, the second ratio is 1.

With reference to the first possible implementation manner of the first aspect or the second possible implementation manner of the first aspect, in a third possible implementation manner of the first aspect, a formula for obtaining the correction coefficient is as follows:

$$T_i' = \frac{T_i}{T_1},$$

where $T_i'$ is the correction coefficient of the $i^{th}$ pixel point of the $n^{th}$ frame of image, $T_i$ is the first ratio, and $T_1$ is the second ratio.

With reference to the first aspect, in a fourth possible implementation manner of the first aspect, the location of the $i^{th}$ pixel point of the $n^{th}$ frame of image includes a column coordinate of the location of the $i^{th}$ pixel point of the $n^{th}$ frame of image, and the correcting a location of the $i^{th}$ pixel point of the $n^{th}$ frame of image according to the correction coefficient using a location of an $i^{th}$ pixel point of the first frame of image as a reference includes obtaining, according to the column coordinate and the correction coefficient, a column coordinate of the $i^{th}$ pixel point after correction.

With reference to the fourth possible implementation manner of the first aspect, in a fifth possible implementation manner of the first aspect, a formula for obtaining, according to the column coordinate and the correction coefficient, the column coordinate of the $i^{th}$ pixel point after correction is as follows:

$$J' - \frac{\text{width}}{2} = \left(J - \frac{\text{width}}{2}\right) \times T_i',$$

where J' is the column coordinate of the $i^{th}$ pixel point after correction, J is the column coordinate of the location of the $i^{th}$ pixel point of the $n^{th}$ frame of image, width is a width of an image using a pixel as a unit, and $T_i'$ is the correction coefficient.

According to a second aspect, the present disclosure provides an image distortion correction apparatus, where the apparatus includes an image shooting unit configured to shoot an $n^{th}$ frame of image at a first angle deviating from a vertical direction and shoot the first frame of image at a second angle deviating from the vertical direction, where the second angle is less than the first angle, and the first angle and the second angle are angles when the images are shot at a same side in the vertical direction, a measurement unit configured to measure a first distance value, a second distance value, a third distance value, and a fourth distance value, where the first distance value is a projection of a distance value of a first pixel point of the $n^{th}$ frame of image to an optical center onto an optical axis direction when the image shooting unit shoots the $n^{th}$ frame of image at the first angle deviating from the vertical direction, the second distance value is a projection of a distance value of an $i^{th}$ pixel point of the $n^{th}$ frame of image to the optical center onto the optical axis direction when the image shooting unit shoots the $n^{th}$ frame of image at the first angle deviating from the vertical direction, and the first pixel point is a pixel point at a lowest end of the $n^{th}$ frame of image, the third distance value is a projection of a pixel point at an uppermost end of the first frame of image to the optical center onto the optical axis direction when the image shooting unit shoots the first frame of image at the second angle deviating from the vertical direction, and the fourth distance value is a projection of a pixel point at a lowest end of the first frame of image to the optical center onto the optical axis direction when the image shooting unit shoots the first frame of image at the second angle deviating from the vertical direction, a processing unit configured to obtain a correction coefficient of the $i^{th}$ pixel point of the $n^{th}$ frame of image according to the first distance value, the second distance value, the third distance value, and the fourth distance value that are measured by the measurement unit, and a correction unit configured to correct a location of the $i^{th}$ pixel point of the $n^{th}$ frame of image according to the correction coefficient obtained by the processing unit and using a location of an $i^{th}$ pixel point of the first frame of image as a reference, where a value of n is 2 to N, and a value of N is a positive integer greater than or equal to 2.

With reference to the second aspect, in a first possible implementation manner of the second aspect, the processing unit is further configured to obtain a first ratio according to the first distance value and the second distance value, obtain a second ratio according to the third distance value and the fourth distance value, and obtain the correction coefficient of the $i^{th}$ pixel point of the $n^{th}$ frame of image according to the first ratio and the second ratio.

With reference to the first possible implementation manner of the second aspect, in a second possible implementation manner of the second aspect, the second ratio is 1.

With reference to the first possible implementation manner of the second aspect or the second possible implementation manner of the second aspect, in a third possible implementation manner of the second aspect, a formula for obtaining, by the processing unit, the correction coefficient is as follows:

$$T_i' = \frac{T_i}{T_1},$$

where $T_i'$ is the correction coefficient of the $i^{th}$ pixel point of the $n^{th}$ frame of image, $T_i$ is the first ratio, and $T_1$ is the second ratio.

With reference to the second aspect, in a fourth possible implementation manner of the second aspect, the location of the $i^{th}$ pixel point of the $n^{th}$ frame of image includes a column coordinate of the location of the $i^{th}$ pixel point of the $n^{th}$ frame of image, and the correction unit is further configured to obtain, according to the column coordinate of the location of the $i^{th}$ pixel point of the $n^{th}$ frame of image and the correction coefficient, a column coordinate of the $i^{th}$ pixel point after correction.

With reference to the fourth possible implementation manner of the second aspect, in a fifth possible implementation manner of the second aspect, a formula for obtaining, by the correction unit according to the column coordinate and the correction coefficient, the column coordinate of the $i^{th}$ pixel point after correction is as follows:

$$J' = \left(J - \frac{\text{width}}{2}\right) \times T_i' + \frac{\text{width}}{2},$$

where J' is the column coordinate of the $i^{th}$ pixel point after correction, J is the column coordinate of the location of the $i^{th}$ pixel point of the $n^{th}$ frame of image, width is a width of an image using a pixel as a unit, and $T_i'$ is the correction coefficient.

According to a third aspect, the present disclosure provides an image distortion correction apparatus, where the apparatus includes a camera module configured to shoot a static or dynamic image, one or more processors, a memory, and one or more programs, where the one or more programs are stored in the memory and are executed by the one or more processors, and the one or more programs include an instruction for performing the method in any one of the first aspect to the fifth possible implementation manner of the first aspect.

According to a fourth aspect, the present disclosure provides a computer readable storage medium storing one or more programs, where the one or more programs include instructions, when a portable electronic device including a display and multiple application programs executes the instruction, the portable electronic device performs the method in any one of the first aspect to the fifth possible implementation manner of the first aspect, where the display includes a touch-sensitive surface and a display screen.

Based on the foregoing technical solutions, in the image distortion correction method and apparatus provided in the embodiments of the present disclosure, a correction coefficient of a location of a pixel point of the $n^{th}$ frame of image relative to a pixel point of the first frame of image is obtained, the $n^{th}$ frame of image is corrected according to the correction coefficient, and the corrected image and the first frame of image are used for image merging in order to resolve a problem of image deformation and avoid geometric distortion, for example, the composite image is not perpendicular and the top bends or is deformed, helping improving a panorama shooting effect.

DESCRIPTION OF EMBODIMENTS

The following describes in detail the technical solutions of the present disclosure with reference to the accompanying drawings and embodiments.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
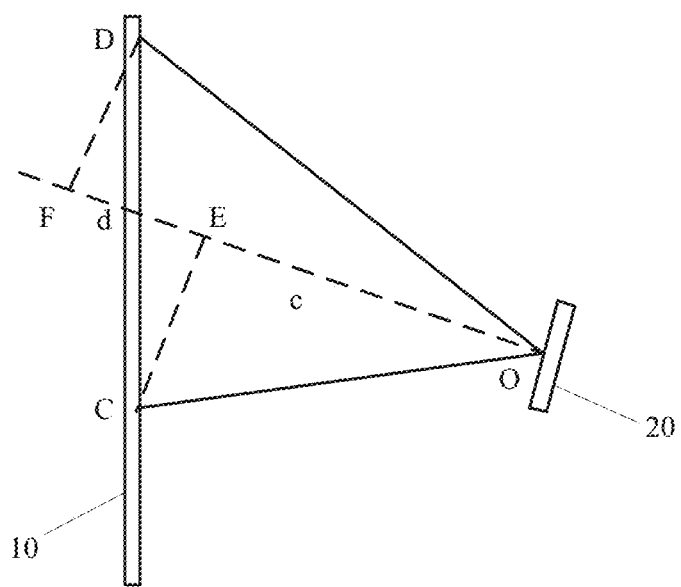
FIG. 1 is a schematic diagram of an image distortion generation principle when a panorama image is shot in a vertical direction.
Figure 2:
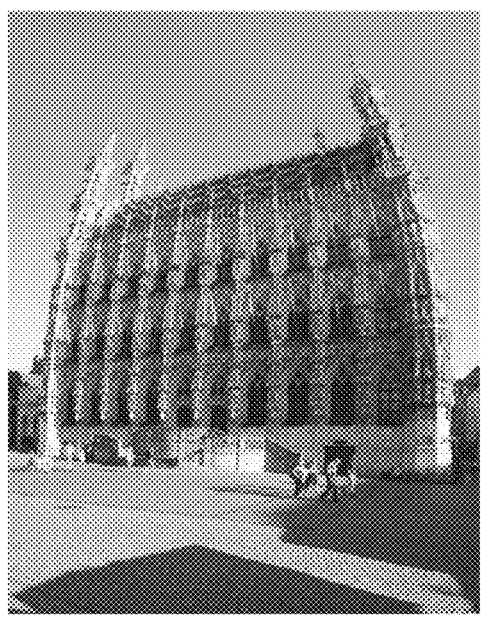
FIG. 2 is an effect diagram of merging using distorted images.
Figure 3A:
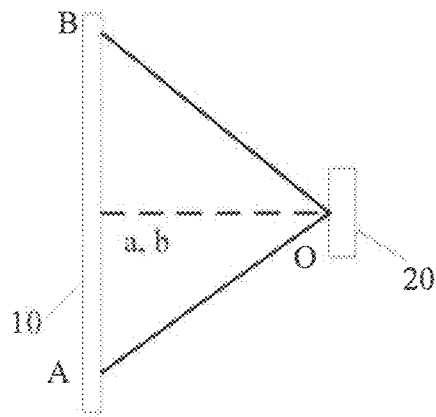
FIG. 3A and FIG. 3B are schematic diagrams of an image distortion generation principle according to Embodiment 1 of the present disclosure.
Figure 3B:
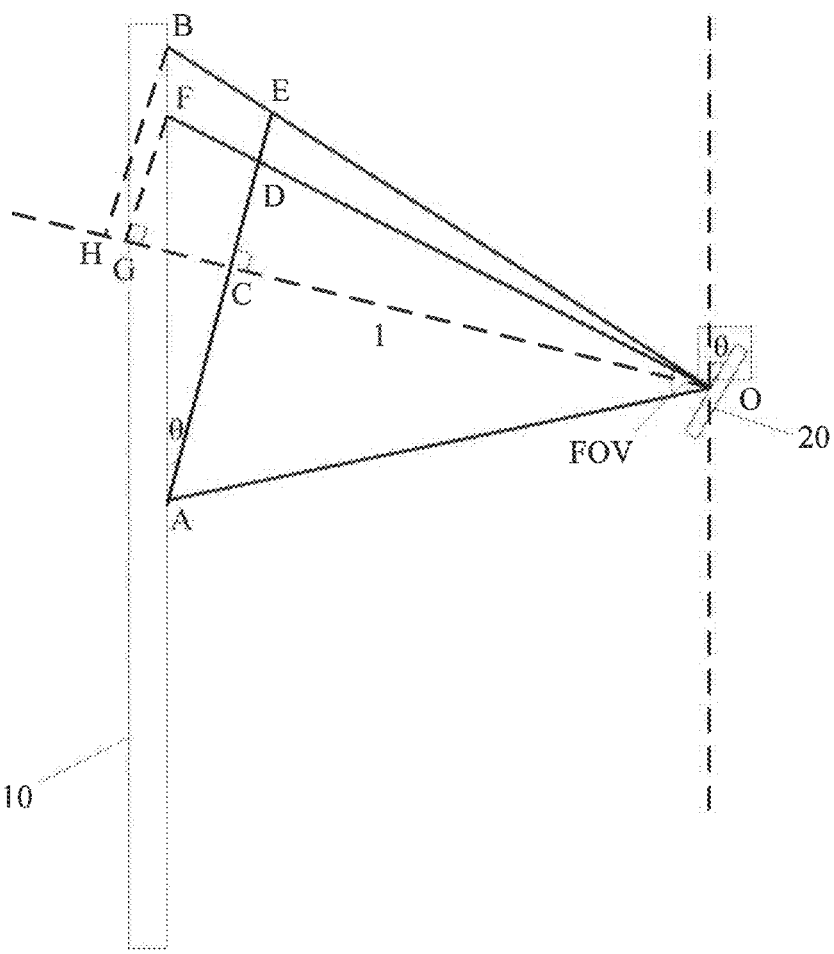

FIG. 3A and FIG. 3B are schematic diagrams of an image distortion generation principle according to Embodiment 1 of the present disclosure. As shown in FIG. 3A and FIG. 3B, this embodiment is described using only an example in which a mobile phone 20 is used to shoot a relatively high building 10 and two frames of images are shot only in a vertical direction. A method for processing more frames of images is similar, and details are not described herein.

Assuming that when the first frame of image is shot, an optical axis (shown by a dashed line in FIG. 3A) of a camera is perpendicular to an imaging plane of the building 10, within a range of a vertical perspective ∠AOB of the camera, projections of distance values of any point on the imaging plane of the building 10 to an optical center O onto an optical axis direction are equal. For example, a projected distance value a of a distance value of point A to the optical center O onto the optical axis direction is equal to a projected distance value b of point B to the optical center O onto the optical axis direction. In this case, a left side and a right side of the building 10 are vertical in the image and are not deformed.

When the second image is shot, as shown in FIG. 3B, a tilt angle between the camera (an object shown at point O in the FIG. 3B) of the mobile phone 20 and the vertical direction is θ, point O (which is also a location of the optical center) is a location in which the camera of the mobile phone 20 is placed, a dashed line OH represents the optical axis, point A and point B are respectively a point at a lowest end and a point at an uppermost end of the building 10 that can be shot when the mobile phone 20 shoots the building 10 at an angle θ deviating from the vertical direction, and a line segment AC is perpendicular to the optical axis, and intersects with the optical axis at point C. The line segment AC is extended and intersects with a ray OB at point E. It can be seen from the FIG. 3B that when a perspective ∠AOB of the camera in the vertical direction is FOV, projections of distance values of points at different heights of the imaging plane of the building 10 to the optical center O onto the optical axis direction are not equal any more.

It should be noted that a line segment AE is actually a row coordinate axis of a pixel in the image, that is, each point on the line segment AE represents a common row coordinate of a column of pixel points on the image.

In order to correct a deformed image, a correction coefficient may be obtained using the following method.

AE is perpendicular to the optical axis OH and intersects with the optical axis at point C. Assuming that OC=1, $$\angle BAO = \theta + \frac{(\pi - FOV)}{2} \quad \text{(formula 3-1)}$$

$$OA = \frac{1}{\cos(FOV/2)} \quad \text{(formula 3-2)}$$

For any point D on the AE, OD is extended to intersect with the building 10 at point F, therefore:

$$AD = 1 \times \tan\left(\frac{FOV}{2}\right) \times 2 \times \left[\frac{height - 1 - i}{height - 1}\right] \quad \text{(formula 3-3)}$$

$$\angle COD = \operatorname{atan}\left[\left(AD - 1 \times \tan\left(\frac{FOV}{2}\right)\right)/1\right], \quad \text{(formula 3-4)}$$

where point D corresponds to a row coordinate i of the pixel point, i is a value greater than or equal to 0 and less than or equal to height−1, and the height is a maximum value of an image height using a pixel as a unit. In FIG. 3B, AE corresponds to a row coordinate axis of the pixel point of the image.

In a triangle AOF, according to the Law of Sines, $$\frac{OF}{\sin(\angle BAO)} = \frac{OA}{\sin(\angle OFA)} = \frac{OA}{\sin\left(\pi - \angle BAO - \frac{FOV}{2} - \angle COD\right)} \quad \text{(formula 3-5)}$$

Therefore:

$$OF = \frac{OA}{\sin\left(\pi - \angle BAO - \frac{FOV}{2} - \angle COD\right)} \times \sin(\angle BAO) \quad \text{(formula 3-6)}$$

A correction coefficient of a location of a pixel point of a distorted image may be obtained by substituting formula (3-4) and formula (3-6) into formula (3-7):

$$\frac{OG}{OC} = \frac{OF}{1/\cos(\angle COD)}, \quad \text{(formula 3-7)}$$

where OG is a projected distance value of a distance value of point F to the optical center O onto the optical axis direction, and OC is a projected distance value of a distance value of point A to the optical center O onto the optical axis direction.

It should be noted that because a pixel row coordinate corresponding to point F and a pixel row coordinate corresponding to point D are the same one, the OG may be understood as a projected distance value of a distance value of point D to the optical center O onto the optical axis direction.

It means that in the shot image, a width of an image at the row coordinate i of the pixel point D needs to be multiplied by OG/OC, to be the same as a width of an image of an object at point A. For a corresponding column coordinate j, a coordinate j_new after correction is:

$$j_{-new} - \frac{width}{2} = \left(j - \frac{width}{2}\right) \times \frac{OG}{OC} \quad \text{(formula 3-8)}$$

That is:

$$j_{-new} = \left(j - \frac{width}{2}\right) \times \frac{OG}{OC} + \frac{width}{2}, \quad \text{(formula 3-9)}$$

where j is a value greater than or equal to 0 and less than or equal to width−1, width−1 is a maximum value of a column coordinate of the image, and width is a maximum value of a width using a pixel point as a unit in the image.

It should be understood that the column coordinate j_new calculated according to formula (3-8) is generally a floating point number, and a column coordinate integral value may be obtained through linear or bilinear interpolation calculation.

It should be further understood that because when the building 10 is shot, a shot image does not change in height, that is, a row coordinate value does not change, correction is not required. Deformation happens only in width, and in most cases, the shot images are upper-narrow lower-wide. Therefore, only the column coordinate needs to be corrected. When an image is shot, two sides of the image are deformed, and a middlemost location is not deformed. Therefore, when the column coordinate is corrected, the middlemost location of the image may be used as a coordinate origin O, to correct other column coordinates. Therefore, during a process of correcting the column coordinate in the foregoing formula (3-8) and formula (3-9), $$\frac{width}{2}$$

needs to be subtracted. The row coordinate and the column coordinate do not refer to a common horizontal coordinate and a common longitudinal coordinate that are generally understood in mathematics. In this text, the row coordinate and the column coordinate are respectively a row coordinate and a column coordinate of a pixel, and are mainly associated with resolution of the image. For example, pixel resolution of an image is 1024×768, that is, each horizontal line includes 1024 pixel points and there are 768 lines in total. That is, a quantity of scanning columns is 1024 and a quantity of rows is 768. Therefore, the column coordinate of the image is 0 to 1023, and the row coordinate may be 0 to 767.

Values of the foregoing height and width are not directly related to a size of a mobile phone screen. The height may refer to a quantity of rows of pixels of the resolution, and the width may refer to a quantity of pixel points included on each horizontal line. Height−1 may be considered as a row coordinate, that is, a row coordinate of a pixel on the highest line of the image. When a quantity of rows is 768, a maximum value height−1 of the row coordinate is 767. Similarly, width−1 is a column coordinate, and when each horizontal line includes 1024 pixel points, a maximum value width−1 of the column coordinate is 1023.

It should be further understood that OG/OC is not a correction coefficient for all pixel points. A correction coefficient is a value that continuously changes according to different locations of the pixel points. However, if row coordinates of multiple pixel points are the same, correction coefficients of the pixel points in the row may be the same. That is, the correction coefficient corresponds to the row coordinate. Moreover, a method for obtaining a correction coefficient of another pixel point is similar to the method for obtaining OG/OC, and details are not described herein again.

Figure 4A:
FIG. 4A and FIG. 4B is a group of effect comparison diagrams of images before and after correction according to the present disclosure.
Figure 4B:

FIG. 4A and FIG. 4B are effect comparison diagrams of images before and after correction after an image is corrected using the correction method according to the foregoing Embodiment 1. FIG. 4A is an image before correction, and FIG. 4B is an image after correction. It can be obviously seen from the FIGS. 4A and 4B that an upper-narrow lower-wide image in FIG. 4A is corrected, using the foregoing introduced method, to an image an upper part and a lower part of which have a same width in FIG. 4B. By means of the method, a problem of image distortion is obviously avoided.

Figure 5:
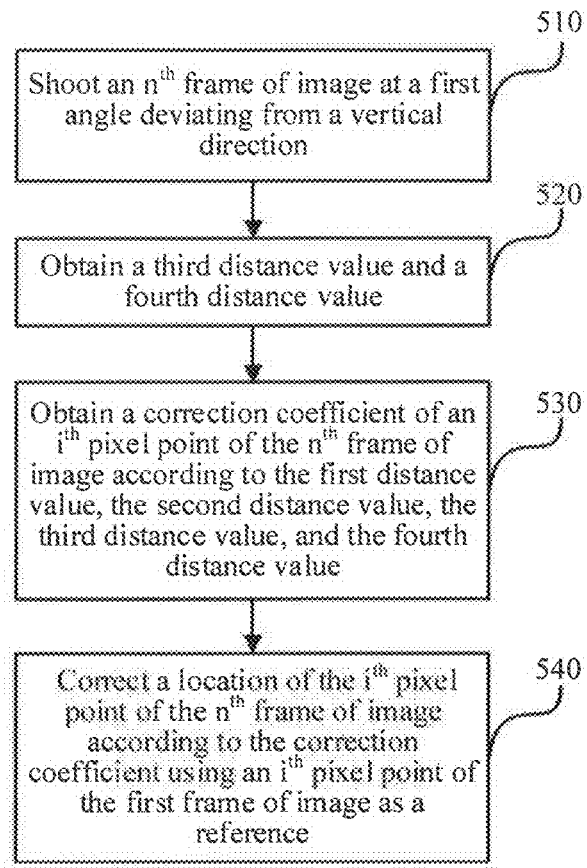
FIG. 5 is a flowchart of an image distortion correction method according to Embodiment 2 of the present disclosure.

FIG. 5 is a flowchart 500 of an image distortion correction method according to Embodiment 2 of the present disclosure. As shown in FIG. 5, the method includes the following steps.

Step 510: Shoot an $n^{th}$ frame of image at a first angle deviating from a vertical direction.

Further, when the $n^{th}$ frame of image is shot at the first angle deviating from the vertical direction, a projection of a distance value of a first pixel point of the image to an optical center onto an optical axis direction is a first distance value, and a projection of a distance value of an $i^{th}$ pixel point to the optical center onto the optical axis direction is a second distance value, where a value of n is 2 to N, and a value of N is a positive integer greater than or equal to 2.

It should be understood that when the $n^{th}$ frame of image is shot, the first pixel point of the image is any pixel point at a lowest end of the image.

Step 520: Obtain a third distance value and a fourth distance value.

Further, the third distance value is a projection of a pixel point at an uppermost end of the first frame of image to the optical center onto the optical axis direction when the first frame of image is shot at a second angle deviating from the vertical direction, and the fourth distance value is a projection of a pixel point at a lowest end of the first frame of image to the optical center onto the optical axis direction when the first frame of image is shot at the second angle deviating from the vertical direction. The second angle is less than the first angle, and the first angle and the second angle are angles when the images are shot at a same side in the vertical direction.

For example, when the first frame of image is shot by a mobile phone at a particular angle deviating from the vertical direction towards the right, the second frame of image is also shot at a particular angle deviating from the vertical direction towards the right.

Step 530: Obtain a correction coefficient of an $i^{th}$ pixel point of the $n^{th}$ frame of image according to a first distance value, a second distance value, the third distance value, and the fourth distance value.

Further, a first ratio is obtained according to the first distance value and the second distance value, a second ratio is obtained according to the third distance value and the fourth distance value, and the correction coefficient of the $i^{th}$ pixel point of the $n^{th}$ frame of image is obtained according to the first ratio and the second ratio.

Methods for obtaining the first ratio and the second ratio are similar to the method for obtaining "OG/OC" using an image distortion correction principle that is introduced in the foregoing text, and details are not described herein again.

It should be understood that the $n^{th}$ frame of image is corrected using the first frame of image as a reference. Therefore, the correction coefficient of the $i^{th}$ pixel point of the $n^{th}$ frame of image is:

$$T'_i = \frac{T_i}{T_1}, \quad (5\text{-}1)$$

where $T'_i$ is the correction coefficient of the $i^{th}$ pixel point of the $n^{th}$ frame of image, $T_i$ is the first ratio, and $T_1$ is the second ratio.

It should be further understood that, as can be known from the foregoing introduction of an image distortion correction principle, when an optical axis (shown by a dashed line in FIG. 3A) of a camera is perpendicular to an imaging plane of a building 10, projections of distance values of points on the imaging plane of the building 10 to the optical center O onto the optical axis direction are equal. Therefore, a left side and a right side of the building 10 are vertical in the image and are not deformed. When the camera shoots an object at a first angle $\theta_i$, a shot image is deformed, and projections of distance values of points at different heights of the building in the image to the optical center O onto the optical axis direction are not equal any more. Therefore, an objective of calculating the first ratio $T_i$ is to calculate a proportion of image deformation when the $n^{th}$ frame of image deviates from the vertical direction by the first angle $\theta_i$, relative to an ideal status (that is, the optical axis of the camera is perpendicular to the imaging plane of the building 10). Similarly, an objective of calculating the second ratio $T_1$ is to calculate a proportion of image deformation when the first frame of image deviates from the vertical direction by the second angle $\theta_2$, relative to the ideal status.

Optionally, the second ratio may be 1 when the first frame of image that is shot is an image in the ideal status.

Further, when the first frame of image is shot, the optical axis (shown by the dashed line in FIG. 3A) of the camera of a mobile phone 20 is perpendicular to the imaging plane of the building 10. Therefore, within a range of a vertical perspective ∠AOB of the camera, projections of distance values of points on the imaging plane of the building 10 to the optical center O onto the optical axis direction are equal. In this case, the second ratio is 1.

Step 540: Correct a location of the $i^{th}$ pixel point of the $n^{th}$ frame of image according to the correction coefficient using an $i^{th}$ pixel point of the first frame of image as a reference.

The location of the $i^{th}$ pixel point of the $n^{th}$ frame of image includes a column coordinate of the location of the $i^{th}$ pixel point of the $n^{th}$ frame of image.

A column coordinate of the $i^{th}$ pixel point after correction is obtained according to the column coordinate and the correction coefficient.

Further, the column coordinate of the corrected location of the $i^{th}$ pixel point may be obtained according to formula (5-2):

$$J' - \frac{\text{width}}{2} = \left(J - \frac{\text{width}}{2}\right) \times T'_i \quad (5\text{-}2)$$

That is:

$$J' = \left(J - \frac{\text{width}}{2}\right) \times T_i' + \frac{\text{width}}{2}, \quad (5\text{-}3)$$

where J' is the column coordinate of the $i^{th}$ pixel point after correction, J is the column coordinate of the location of the $i^{th}$ pixel point of the $n^{th}$ frame of image, width is a width of an image using a pixel as a unit, and $T_i'$ is the correction coefficient.

It should be understood that the column coordinate J' that is of the corrected location of the $i^{th}$ pixel point and that is calculated according to formula (5-3) is generally a floating point number, and integral column coordinate data may be calculated and obtained using a method such as linear or bilinear interpolation.

It should be further understood that the correction coefficient $T_i'$ in this embodiment is not a correction coefficient for all pixel points. A correction coefficient is a value that continuously changes according to different locations of the pixel points. However, if row coordinates of multiple pixel points are the same, correction coefficients of the pixel points in the row may be the same. That is, the correction coefficient corresponds to the row coordinate. Moreover, a method for obtaining a correction coefficient of another pixel point is similar to the method for obtaining $T_i'$, and details are not described herein again.

In addition, it should be noted that in the present disclosure, an image shooting angle may be obtained using a gyro-sensor in an electronic device, or may be obtained in another manner, and this is not limited herein.

In the image distortion correction method provided in Embodiment 2 of the present disclosure, a correction coefficient of a location of a pixel point of the $n^{th}$ frame of image relative to a pixel point of the first frame of image is obtained, the $n^{th}$ frame of image is corrected according to the correction coefficient, and the corrected image and the first frame of image are used for image merging in order to resolve a problem of image deformation and avoid geometric distortion, for example, the composite image is not perpendicular and the top bends or is deformed, helping improving a panorama shooting effect.

Figure 6:
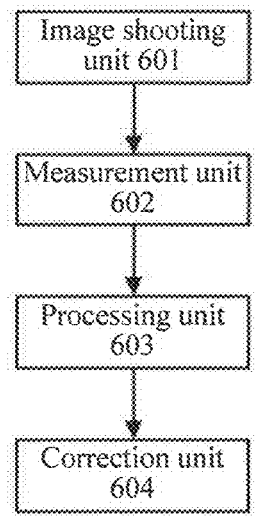
FIG. 6 is a schematic diagram of an image distortion correction apparatus according to Embodiment 3 of the present disclosure.

FIG. 6 shows an image distortion correction apparatus according to Embodiment 3 of the present disclosure. As shown in FIG. 6, the apparatus includes an image shooting unit 601, a measurement unit 602, a processing unit 603, and a correction unit 604.

The image shooting unit 601 is configured to shoot an $n^{th}$ frame of image at a first angle deviating from a vertical direction and shoot the first frame of image at a second angle deviating from the vertical direction.

Further, when the image shooting unit 601 shoots the $n^{th}$ frame of image and the first frame of image, during shooting, the second angle is less than the first angle, and the first angle and the second angle are angles when the images are shot at a same side in the vertical direction. For example, when the image shooting unit 601 shoots the first frame of image at a particular angle deviating from the vertical direction towards the right, the second frame of image is also shot at a particular angle deviating from the vertical direction towards the right. A value of n is 2 to N, and a value of N is a positive integer greater than or equal to 2.

The measurement unit 602 is configured to measure a first distance value, a second distance value, a third distance value, and a fourth distance value.

The first distance value is a projection of a distance value of a first pixel point of the $n^{th}$ frame of image to an optical center onto an optical axis direction when the image shooting unit 601 shoots the $n^{th}$ frame of image at the first angle deviating from the vertical direction, the second distance value is a projection of a distance value of an $i^{th}$ pixel point of the $n^{th}$ frame of image to the optical center onto the optical axis direction when the image shooting unit 601 shoots the $n^{th}$ frame of image at the first angle deviating from the vertical direction, and the first pixel point is a pixel point at a lowest end of the $n^{th}$ frame of image.

The third distance value is a projection of a pixel point at an uppermost end of the first frame of image to the optical center onto the optical axis direction when the image shooting unit 601 shoots the first frame of image at the second angle deviating from the vertical direction, and the fourth distance value is a projection of a pixel point at a lowest end of the first frame of image to the optical center onto the optical axis direction when the image shooting unit 601 shoots the first frame of image at the second angle deviating from the vertical direction.

The processing unit 603 is configured to obtain a correction coefficient of the $i^{th}$ pixel point of the $n^{th}$ frame of image according to the first distance value, the second distance value, the third distance value, and the fourth distance value that are measured by the measurement unit 602.

Further, the processing unit 603 obtains a first ratio according to the first distance value and the second distance value, obtains a second ratio according to the third distance value and the fourth distance value, and obtains the correction coefficient of the $i^{th}$ pixel point of the $n^{th}$ frame of image according to the first ratio and the second ratio.

Methods for obtaining the first ratio and the second ratio are similar to the method for obtaining "OG/OC" using an image distortion correction principle that is introduced in the foregoing text, and details are not described herein again.

It should be understood that the $n^{th}$ frame of image is corrected using the first frame of image as a reference. Therefore, the correction coefficient of the $i^{th}$ pixel point of the $n^{th}$ frame of image is:

$$T_i' = \frac{T_i}{T_1}, \quad (6\text{-}1)$$

where $T_i'$ is the correction coefficient of the $i^{th}$ pixel point of the $n^{th}$ frame of image, $T_i$ is the first ratio, and $T_1$ is the second ratio.

It should be further understood that, as can be known from the foregoing introduction of an image distortion correction principle, when an optical axis (shown by a dashed line in FIG. 3A) is perpendicular to an imaging plane of a building 10, projections of distance values of points on the imaging plane of the building 10 to the optical center O onto the optical axis direction are equal. Therefore, a left side and a right side of the building 10 are vertical in the image and are not deformed. When the image shooting unit 601 shoots an object at a first angle $\theta_i$, a shot image is deformed, and projections of distance values of points at different heights of the building in the image to the optical center O onto the optical axis direction are not equal any more. Similarly, an objective of calculating the first ratio $T_i$ by the processing unit 603 is to calculate a proportion of image deformation when the $n^{th}$ frame of image deviates from the vertical direction by the first angle $\theta_i$ in, relative to an ideal status. Similarly, an objective of calculating the second ratio $T_1$ is to calculate a proportion of image deformation when the first frame of image deviates from the vertical direction by the second angle $\theta_2$ in the, relative to the ideal status.

Optionally, when the first frame of image shot by the image shooting unit 601 is an image in the ideal status, the second ratio may be 1.

When the image shooting unit 601 shoots the first frame of image, the optical axis (shown by the dashed line in FIG. 3A) is perpendicular to the imaging plane of the building 10. Therefore, within a range of a vertical perspective $\angle AOB$ of the camera, projections of distance values of points on the imaging plane of the building 10 to the optical center O onto the optical axis direction are equal. In this case, the second ratio is 1.

The correction unit 604 is configured to correct a location of the $i^{th}$ pixel point of the $n^{th}$ frame of image according to the correction coefficient obtained by the processing unit 603 and using the $i^{th}$ pixel point of the first frame of image as a reference.

The location of the $i^{th}$ pixel point of the $n^{th}$ frame of image includes a column coordinate of the location of the $i^{th}$ pixel point of the $n^{th}$ frame of image.

A column coordinate of the $i^{th}$ pixel point after correction is obtained according to the column coordinate and the correction coefficient.

The column coordinate of the corrected location of the $i^{th}$ pixel point may be obtained according to formula (6-2):

$$J' - \frac{\text{width}}{2} = \left(J - \frac{\text{width}}{2}\right) \times T_i'. \tag{6-2}$$

That is:

$$J' = \left(J - \frac{\text{width}}{2}\right) \times T_i' + \frac{\text{width}}{2}, \tag{6-3}$$

where J' is the column coordinate of the $i^{th}$ pixel point after correction, J is the column coordinate of the location of the $i^{th}$ pixel point of the $n^{th}$ frame of image, width is a width of an image using a pixel as a unit, and $T_i'$ is the correction coefficient.

It should be understood that the column coordinate J' that is of the corrected location of the $i^{th}$ pixel point and that is calculated according to formula (6-3) is generally a floating point number, and integral column coordinate data may be calculated and obtained using a method such as linear or bilinear interpolation.

It should be further understood that the correction coefficient $T_i'$ in this embodiment is not a correction coefficient for all pixel points. A correction coefficient is a value that continuously changes according to different locations of the pixel points. However, if row coordinates of multiple pixel points are the same, correction coefficients of the pixel points in the row may be the same. That is, the correction coefficient corresponds to the row coordinate. Moreover, a method for obtaining a correction coefficient of another pixel point is similar to the method for obtaining $T_i'$, and details are not described herein again.

In the image distortion correction apparatus provided in Embodiment 3 of the present disclosure, the processing unit 603 obtains a correction coefficient of a location of a pixel point of the $n^{th}$ frame of image relative to a pixel point of the first frame of image, and the correction unit 604 corrects the $n^{th}$ frame of image according to the correction coefficient, and the corrected image and the first frame of image are used for image merging in order to resolve a problem of image deformation and avoid geometric distortion, for example, the composite image is not perpendicular and the top bends or is deformed, help improving a panorama shooting effect.

Figure 7:
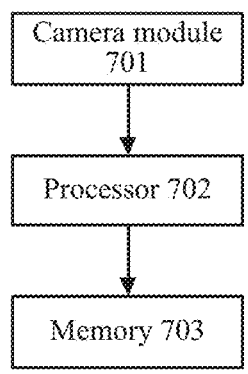
FIG. 7 is a schematic diagram of an image distortion correction apparatus according to Embodiment 4 of the present disclosure.

FIG. 7 shows an image distortion correction apparatus according to Embodiment 4 of the present disclosure. As shown in FIG. 7, the apparatus includes a camera module 701 configured to shoot a static or dynamic image, one or more processors 702, a memory 703, and one or more programs, where the one or more programs are stored in the memory 703 and are executed by the one or more processors 702. The one or more programs include an instruction used to perform the method of shooting an $n^{th}$ frame of image at a first angle deviating from a vertical direction, where a projection of a distance value of a first pixel point of the $n^{th}$ frame of image to an optical center onto an optical axis direction is a first distance value, a projection of a distance value of an $i^{th}$ pixel point of the $n^{th}$ frame of image to the optical center onto the optical axis direction is a second distance value, and the first pixel point is a pixel point at a lowest end of the $n^{th}$ frame of image, and obtaining a third distance value and a fourth distance value, where the third distance value is a projection of a pixel point at an uppermost end of the first frame of image to the optical center onto the optical axis direction when the first frame of image is shot at a second angle deviating from the vertical direction, the fourth distance value is a projection of a pixel point at a lowest end of the first frame of image to the optical center onto the optical axis direction when the first frame of image is shot at the second angle deviating from the vertical direction, the second angle is less than the first angle, and the first angle and the second angle are angles when the images are shot at a same side in the vertical direction.

That a correction coefficient of the $i^{th}$ pixel point of the $n^{th}$ frame of image is obtained according to the first distance value, the second distance value, the third distance value, and the fourth distance value includes obtaining a first ratio according to the first distance value and the second distance value, obtaining a second ratio according to the third distance value and the fourth distance value, and obtaining the correction coefficient of the $i^{th}$ pixel point of the $n^{th}$ frame of image according to the first ratio and the second ratio, where a value of n is 2 to N, and a value of N is a positive integer greater than or equal to 2.

The second ratio may be 1.

A formula for obtaining the correction coefficient is as follows:

$$T_i' = \frac{T_i}{T_1}, \tag{7-1}$$

where $T_i'$ is the correction coefficient of the $i^{th}$ pixel point of the $n^{th}$ frame of image, $T_i$ is the first ratio, and $T_1$ is the second ratio.

A location of the $i^{th}$ pixel point of the $n^{th}$ frame of image is corrected according to the correction coefficient using the $i^{th}$ pixel point of the first frame of image as a reference, and the location of the $i^{th}$ pixel point of the $n^{th}$ frame of image includes a column coordinate of the location of the $i^{th}$ pixel point of the $n^{th}$ frame of image.

That a location of the $i^{th}$ pixel point of the $n^{th}$ frame of image is corrected according to the correction coefficient using the $i^{th}$ pixel point of the first frame of image as a reference includes obtaining, according to the column coordinate and the correction coefficient, a column coordinate of the $i^{th}$ pixel point after correction.

A specific formula is as follows:

$$J' = \left(J - \frac{\text{width}}{2}\right) \times T'_i + \frac{\text{width}}{2}, \quad (7\text{-}2)$$

where J' is the column coordinate of the $i^{th}$ pixel point after correction, J is the column coordinate of the location of the $i^{th}$ pixel point of the $n^{th}$ frame of image, width is a width of an image using a pixel as a unit, and $T_i'$ is the correction coefficient.

It should be noted that in the present disclosure, an image shooting angle may be obtained using a gyro-sensor in an electronic device, or may be obtained in another manner, and this is not limited herein.

In the image distortion correction apparatus provided in Embodiment 4 of the present disclosure, a correction coefficient of a location of a pixel point of the $n^{th}$ frame of image relative to a pixel point of the first frame of image is obtained, the $n^{th}$ frame of image is corrected according to the correction coefficient, and the corrected image and the first frame of image are used for image merging in order to resolve a problem of image deformation and avoid geometric distortion, for example, the composite image is not perpendicular and the top bends or is deformed, helping improving a panorama shooting effect.

In addition, Embodiment 5 of the present disclosure further provides a computer readable storage medium storing one or more programs, where the one or more programs include an instruction. When a portable electronic device including a display and multiple application programs executes the instruction, the portable electronic device performs the following method. The display includes a touch-sensitive surface and a display screen.

The performed method includes shooting an $n^{th}$ frame of image at a first angle deviating from a vertical direction, where a projection of a distance value of a first pixel point of the $n^{th}$ frame of image to an optical center onto an optical axis direction is a first distance value, a projection of a distance value of an $i^{th}$ pixel point of the $n^{th}$ frame of image to the optical center onto the optical axis direction is a second distance value, and the first pixel point is a pixel point at a lowest end of the $n^{th}$ frame of image, and obtaining a third distance value and a fourth distance value, where the third distance value is a projection of a pixel point at an uppermost end of the first frame of image to the optical center onto the optical axis direction when the first frame of image is shot at a second angle deviating from the vertical direction, the fourth distance value is a projection of a pixel point at a lowest end of the first frame of image to the optical center onto the optical axis direction when the first frame of image is shot at the second angle deviating from the vertical direction, the second angle is less than the first angle, and the first angle and the second angle are angles when the images are shot at a same side in the vertical direction.

That a correction coefficient of the $i^{th}$ pixel point of the $n^{th}$ frame of image is obtained according to the first distance value, the second distance value, the third distance value, and the fourth distance value includes obtaining a first ratio according to the first distance value and the second distance value, obtaining a second ratio according to the third distance value and the fourth distance value, and obtaining the correction coefficient of the $i^{th}$ pixel point of the $n^{th}$ frame of image according to the first ratio and the second ratio, where a value of n is 2 to N, and a value of N is a positive integer greater than or equal to 2.

The second ratio may be 1.

A formula for obtaining the correction coefficient is as follows:

$$T'_i = \frac{T_i}{T_1},$$

where $T_i'$ is the correction coefficient of the $i^{th}$ pixel point of the $n^{th}$ frame of image, $T_i$ is the first ratio, and $T_1$ is the second ratio.

A location of the $i^{th}$ pixel point of the $n^{th}$ frame of image is corrected according to the correction coefficient using the $i^{th}$ pixel point of the first frame of image as a reference, and the location of the $i^{th}$ pixel point of the $n^{th}$ frame of image includes a column coordinate of the location of the $i^{th}$ pixel point of the $n^{th}$ frame of image.

That a location of the $i^{th}$ pixel point of the $n^{th}$ frame of image is corrected according to the correction coefficient using the $i^{th}$ pixel point of the first frame of image as a reference includes obtaining, according to the column coordinate and the correction coefficient, a column coordinate of the $i^{th}$ pixel point after correction.

A specific formula is as follows:

$$J' = \left(J - \frac{\text{width}}{2}\right) \times T'_i + \frac{\text{width}}{2},$$

where J' is the column coordinate of the $i^{th}$ pixel point after correction, J is the column coordinate of the location of the $i^{th}$ pixel point of the $n^{th}$ frame of image, width is a width of an image using a pixel as a unit, and $T_i'$ is the correction coefficient.

Figure 8A:
FIG. 8A, FIG. 8B, and FIG. 8C are effect comparison diagrams of images corrected using the correction method according to Embodiment 2 of the present disclosure.
Figure 8B:
Figure 8C:
Figure 9A:
FIG. 9A and FIG. 9B are effect comparison diagrams of merging performed separately using an image before correction and an image after correction that are provided in FIG. 8 according to the present disclosure.
Figure 9B:

FIGS. 8A, 8B, and 8C are effect comparison diagrams of two frames of images corrected using the image distortion correction method and the correction apparatus according to the present disclosure. FIG. 8A is the first frame of image that is shot at a second angle (10 degrees in this embodiment of the present disclosure), FIG. 8B is the second frame of image that is shot at a first angle (30 degrees in this embodiment of the present disclosure), and FIG. 8C is an image obtained after the second frame of image is corrected. FIGS. 9A and 9B are effect comparison diagrams of merging performed separately using an image before correction and an image after correction that are provided in FIGS. 8A, 8B, and 8C. FIG. 9A is a composite image based on FIG. 8A and FIG. 8B, and FIG. 9B is a composite image based on FIG. 8A and FIG. 8C. It can be seen from FIG. 9A that the image is obviously deformed, vertical lines bend, and the top of a building contracts towards the middle. In FIG. 9B, a problem of geometric distortion, for example, the composite image is not perpendicular and the top bends or is deformed, is avoided.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. An image distortion correction method, comprising:
shooting an $n^{th}$ frame of an image at a first angle deviating from a vertical direction, wherein a projection of a distance value of a first pixel point of the $n^{th}$ frame of the image to an optical center onto an optical axis direction is a first distance value, wherein a projection of a distance value of an $i^{th}$ pixel point of the $n^{th}$ frame of the image to the optical center onto the optical axis direction is a second distance value, and wherein the first pixel point is a pixel point at a lowest end of the $n^{th}$ frame of the image;
obtaining a third distance value and a fourth distance value, wherein the third distance value is a projection of a pixel point at an uppermost end of a first frame of the image to the optical center onto the optical axis direction when the first frame of the image is shot at a second angle deviating from the vertical direction, wherein the fourth distance value is a projection of a pixel point at a lowest end of the first frame of the image to the optical center onto the optical axis direction when the first frame of image is shot at the second angle deviating from the vertical direction, wherein the second angle is less than the first angle, and wherein the first angle and the second angle are angles when images are shot at a same side in the vertical direction;
obtaining a correction coefficient of the $i^{th}$ pixel point of the $n^{th}$ frame of the image according to a first ratio and a second ratio, the first ratio being obtained according to the first distance value the second distance value, the second ratio being obtained according to the third distance value and the fourth distance value; and
correcting a location of the $i^{th}$ pixel point of the $n^{th}$ frame of the image according to the correction coefficient using a location of an $i^{th}$ pixel point of the first frame of the image as a reference, wherein a value of n is 2 to N, and wherein a value of N is a positive integer greater than or equal to 2.

2. The method according to claim 1, wherein the method further comprises calculating a proportion of image deformation when the $n^{th}$ frame of the image deviates from the vertical direction by the first angle.

3. The method according to claim 1, wherein the second ratio is 1.

4. The method according to claim 1, wherein a formula for obtaining the correction coefficient is $$T_i' = \frac{T_i}{T_1},$$

wherein $T_i'$ is the correction coefficient of the $i^{th}$ pixel point of the $n^{th}$ frame of the image, wherein $T_i$ is the first ratio, and wherein $T_1$ is the second ratio.

5. The method according to claim 1, wherein the location of the $i^{th}$ pixel point of the $n^{th}$ frame of the image comprises a column coordinate of the location of the $i^{th}$ pixel point of the $n^{th}$ frame of the image, and wherein correcting the location of the $i^{th}$ pixel point of the $n^{th}$ frame of the image comprises obtaining, according to the column coordinate and the correction coefficient, a column coordinate of the $i^{th}$ pixel point after correction.

6. The method according to claim 5, wherein a formula for obtaining the column coordinate of the $i^{th}$ pixel point after correction is $$J' = \left(J - \frac{\text{width}}{2}\right) \times T_i' + \frac{\text{width}}{2},$$

wherein J' is the column coordinate of the $i^{th}$ pixel point after correction, wherein J is the column coordinate of the location of the $i^{th}$ pixel point of the $n^{th}$ frame of the image, wherein width is a width of an image using a pixel as a unit, and wherein $T_i'$ is the correction coefficient.

7. An image distortion correction apparatus, comprising:
a camera configured to:
shoot an $n^{th}$ frame of an image at a first angle deviating from a vertical direction; and
shoot a first frame of the image at a second angle deviating from the vertical direction, wherein the second angle is less than the first angle, and wherein the first angle and the second angle are angles when images are shot at a same side in the vertical direction; and
a processor coupled to the camera and configured to:
measure a first distance value, a second distance value, a third distance value, and a fourth distance value, wherein the first distance value is a projection of a distance value of a first pixel point of the $n^{th}$ frame of the image to an optical center onto an optical axis direction when the camera shoots the $n^{th}$ frame of the image at the first angle deviating from the vertical direction, wherein the second distance value is a projection of a distance value of an $i^{th}$ pixel point of the $n^{th}$ frame of the image to the optical center onto the optical axis direction when the camera shoots the $n^{th}$ frame of the image at the first angle deviating from the vertical direction, wherein the first pixel point is a pixel point at a lowest end of the $n^{th}$ frame of the image, wherein the third distance value is a projection of a pixel point at an uppermost end of the first frame of the image to the optical center onto the optical axis direction when the camera shoots the first frame of the image at the second angle deviating from the vertical direction, and wherein the fourth distance value is a projection of a pixel point at a lowest end of the first frame of the image to the optical center onto the optical axis direction when the camera shoots the first frame of image at the second angle deviating from the vertical direction;

obtain a correction coefficient of the $i^{th}$ pixel point of the $n^{th}$ frame of the image according to a first ratio and a second ratio, the first ratio being obtained according to the first distance value the second distance value, the second ratio being obtained according to the third distance value and the fourth distance value; and correct a location of the $i^{th}$ pixel point of the $n^{th}$ frame of the image according to the correction coefficient obtained using a location of an $i^{th}$ pixel point of the first frame of image as a reference, wherein a value of n is 2 to N, and wherein a value of N is a positive integer greater than or equal to 2.

8. The apparatus according to claim 7, wherein the processor is further configured to calculate a proportion of image deformation when the $n^{th}$ frame of the image deviates from the vertical direction by the first angle, relative to an ideal status.

9. The apparatus according to claim 8, wherein the ideal status is based on an optical axis of the camera being perpendicular to an imaging plane of the image.

10. The apparatus according to claim 7, wherein the second ratio is 1.

11. The apparatus according to claim 7, wherein a formula for obtaining the correction coefficient is $$T'_i = \frac{T_i}{T_1},$$

wherein $T'_i$ is the correction coefficient of the $i^{th}$ pixel point of the $n^{th}$ frame of the image, wherein $T_i$ is the first ratio, and wherein $T_1$ is the second ratio.

12. The apparatus according to claim 7, wherein the location of the $i^{th}$ pixel point of the $n^{th}$ frame of the image comprises a column coordinate of the location of the $i^{th}$ pixel point of the $n^{th}$ frame of the image, and wherein the processor is further configured to obtain, according to the column coordinate of the location of the $i^{th}$ pixel point of the $n^{th}$ frame of the image and the correction coefficient, a column coordinate of the $i^{th}$ pixel point after correction.

13. The apparatus according to claim 12, wherein a formula for obtaining the column coordinate of the $i^{th}$ pixel point after correction is $$J' = \left(J - \frac{width}{2}\right) \times T'_i + \frac{width}{2},$$

wherein J' is the column coordinate of the $i^{th}$ pixel point after correction, wherein J is the column coordinate of the location of the $i^{th}$ pixel point of the $n^{th}$ frame of image, wherein width is a width of an image using a pixel as a unit, and wherein $T'_i$ is the correction coefficient.

14. A non-transitory computer readable storage medium storing one or more programs, wherein the one or more programs comprise an instruction, wherein when a portable electronic device comprising a display and a plurality of application programs executes the instruction, the portable electronic device performs a method that comprises:

shooting an $n^{th}$ frame of an image at a first angle deviating from a vertical direction, wherein a projection of a distance value of a first pixel point of the $n^{th}$ frame of the image to an optical center onto an optical axis direction is a first distance value, wherein a projection of a distance value of an $i^{th}$ pixel point of the $n^{th}$ frame of the image to the optical center onto the optical axis direction is a second distance value, and wherein the first pixel point is a pixel point at a lowest end of the $n^{th}$ frame of the image;

obtaining a third distance value and a fourth distance value, wherein the third distance value is a projection of a pixel point at an uppermost end of a first frame of the image to the optical center onto the optical axis direction when the first frame of the image is shot at a second angle deviating from the vertical direction, wherein the fourth distance value is a projection of a pixel point at a lowest end of the first frame of the image to the optical center onto the optical axis direction when the first frame of image is shot at the second angle deviating from the vertical direction, wherein the second angle is less than the first angle, and wherein the first angle and the second angle are angles when images are shot at a same side in the vertical direction;

obtaining a correction coefficient of the $i^{th}$ pixel point of the $n^{th}$ frame of the image according to a first ratio and a second ratio, the first ratio being obtained according to the first distance value and the second distance value, the second ratio being obtained according to the third distance value and the fourth distance value; and correcting a location of the $i^{th}$ pixel point of the $n^{th}$ frame of the image according to the correction coefficient using a location of an $i^{th}$ pixel point of the first frame of the image as a reference, wherein a value of n is 2 to N, wherein a value of N is a positive integer greater than or equal to 2, and wherein the display comprises a touch-sensitive surface and a display screen.

15. The non-transitory computer readable storage medium according to claim 14, wherein correcting the location of the $i^{th}$ pixel point of the $n^{th}$ frame of the image comprises obtaining a column coordinate of the $i^{th}$ pixel point after correction.

16. The non-transitory computer readable storage medium according to claim 14, wherein the location of the $i^{th}$ pixel point of the $n^{th}$ frame of the image comprises a column coordinate of the location of the $i^{th}$ pixel point of the $n^{th}$ frame of the image.

17. The non-transitory computer readable storage medium according to claim 14, wherein the method further comprises calculating a proportion of image deformation when the $n^{th}$ frame of the image deviates from the vertical direction by the first angle.

18. The non-transitory computer readable storage medium according to claim 14, wherein the method further comprises calculating a proportion of image deformation when the first frame of the image deviates from the vertical direction by the second angle.

* * * * *